United States Patent [19]

Taya et al.

[11] Patent Number: 4,527,087
[45] Date of Patent: * Jul. 2, 1985

[54] FLUORESCENT LAMP

[75] Inventors: Akira Taya, Kawasaki; Kazuo Narita, Tokyo; Jun-etsu Akiyama; Masao Asada, both of Yokohama; Hisami Nira, Kawasaki, all of Japan

[73] Assignee: Tokyo Shibaura Denki Kabushiki Kaisha, Kawasaki, Japan

[*] Notice: The portion of the term of this patent subsequent to Feb. 19, 2002 has been disclaimed.

[21] Appl. No.: 413,242

[22] Filed: Aug. 30, 1982

[30] Foreign Application Priority Data

Sep. 3, 1981 [JP] Japan .................. 56-1378838

[51] Int. Cl.³ .................................. H01J 61/44
[52] U.S. Cl. .................... 313/487; 252/301.4 P; 252/301.4 H
[58] Field of Search ............... 252/301.4 P, 301.4 H; 313/486, 487

[56] References Cited

U.S. PATENT DOCUMENTS 3,396,118  8/1968  Datta ........................ 252/301.4
4,038,204  7/1977  Wachtel ................... 252/301.4 P
4,267,485  5/1981  Murakami et al. ............ 313/486
4,353,808  10/1982 Tanimizu et al. .......... 252/301.6 P

FOREIGN PATENT DOCUMENTS 1264422  2/1972  United Kingdom .

Primary Examiner—Jack Cooper
Attorney, Agent, or Firm—Schwartz, Jeffery, Schwaab, Mack, Blumenthal & Evans

[57] ABSTRACT

Disclosed is a fluorescent lamp which comprises a mixture of a phosphor (i) comprising an alkaline earth metal halophosphate phosphor activated with divalent europium, represented by the general formula:

$$M_{5-x}X(PO_4)_3:Eu^{2+}(x)$$

wherein M consists of Ba, Ca and Mg, containing 3 to 4.5 gram-atom of Ba, 0.5 to 2 gram-atom of Ca and 0.01 to 1 gram-atom of Mg each; X is one or more of F, Cl or Br; and $0.01 < x \leq 0.2$ and having the emission peak at the wavelength region of 480 to 500 nm, and a phosphor (ii) having the emission peak at the wavelength region of 620 to 640 nm and having the half width of 120 to 160 nm.

3 Claims, 4 Drawing Figures

FLUORESCENT LAMP

BACKGROUND OF THE INVENTION

This invention relates to a high color rendering fluorescent lamp having radiation color temperature of 4200~5600 K. (Kelvin) and having average color rendering index (Ra) of not less than 95.

Calcium halophosphate phosphors activated with antimony and manganese are widely used for illumination fluorescent lamps for the general use. However, due to its poor color rendering, the use thereof is inadequate at places such as art museums and color printing factories where a high color rendering is required.

There are known heretofore the following measures in order to solve the problem and achieve a high color rendering: In one example, the emitting layer comprises a mixture of several kinds of phosphors so as to approximate the spectral energy distribution of the reference illuminant. In another example, mercury line at the visible short wavelength region hindering good color rendering is suppressed.

Of the above, for the so-called EDL Type lamps that is required to have especially a high color rendering, suppression of mercury line is effective for the improvement in color rendering. For this purpose, there are known a lamp having a double coated phosphor layer or one in which a separate pigment layer is provided.

The former concerns a phosphor layer in which emission energy at 405 and 436 nm mercury line in the visible short wavelength region that hinders improvement in the color rendering is absorbed and, moreover, the absorbed energy itself is converted to the red color radiation; for example, a phosphor combination comprising a first layer of magnesium fluorogermanate activated with manganese (3.5MgO, 0.5MgF$_2$, GeO$_2$:Mn) and a second layer of another phosphor coated thereon (Japanese Patent Publication No. 9868/1966).

The latter is to provide a yellow pigment layer between a glass tube and a phosphor, whereby about 60% of 436 nm mercury line may be suppressed as compared with one in which no pigment layer is provided (Japanese Patent Publication No. 15896/1973). However, the known methods described above involve such disadvantages as production inefficiency due to complication of lamp manufacturing steps, variation of luminous color and color rendering caused by change in the thickness of pigment layer, or lowering of phosphor efficiency caused by absorption of emission energy.

Recently, improvements in the above-mentioned problems have been proposed (Japanese Laid-Open Patent Application Nos. 102073/1979 and 115489/1980). They fail, however, to fully improve the problems.

According to (Japanese Laid-Open Patent Application No. 102073/1979, at least four different species of phosphors including calcium halophosphate and zinc silicate phosphor must be used because the peak wavelength of the blue-green phosphor employed is too short to bring chromaticity coordinate upon blackbody locus. This inevitably gives rise to such disadvantages as considerable variation of luminescent color and color rendering, and lowering of efficiency.

The latter of the above-mentioned Japanese patent documents also relates to such advantages as high efficiency and superior color rendering. However, the disclosed improvement brings about difficulty in color control such as luminescent color and color rendering because three different species of phosphors, including blue and red color phosphors emitting within a narrow wavelength region, must be used admixed.

SUMMARY OF THE INVENTION

This invention aims to solve the above-mentioned problems and to provide more efficient fluorescent lamps than known ones and, at the same time, achieve a high color rendering by mixing only two kinds of phosphors without double layer coating of phosphors or without a pigment layer.

According to this invention, there is provided a fluorescent lamp which comprises a mixture of a phosphor (i) comprising an alkaline earth metal halophosphate activated with divalent europium, represented by the general formula:

$$M_{5-x}X(PO_4)_3:Eu^{2+}{}_{(x)}$$

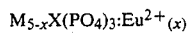

(wherein, M consists of Ba, Ca and Mg, the fraction of Ba being 3 to 4.5 gram-atom, the fraction of Ca being 0.5 to 2 gram-atom and the fraction of Mg being 0.01 to 1 gram-atom each; X is one or more of F, Cl or Br; and $0.01 < x \leq 0.2$),
and having emission peak the wavelength region of 480~500 nm, and a phosphor (ii) having an emission peak at the wavelength region of 620~640 nm and having a half width at 120~160 nm; said mixture being coated inside of a glass tube.

DETAILED DESCRIPTION OF PREFERRED EMBODIMENTS

The inventors have paid attention to the importance of the blue-green phosphors in obtaining a high color rendering, and studied thoroughly with various experiments to attain the above-mentioned objects and found out that a fluorescent lamp characterized by having the above-mentioned construction shows remarkably a higher color rendering characteristic and superior emission efficiency as compared with known fluorescent lamps provided with a double layer coating or a pigment layer and, at the same time, retards lowering of luminous flux during operation.

According to a preferred embodiment of the invention, the characteristics superior to a prior art may be obtained within color temperature range of 4000~5000 K. by admixing the above-mentioned phosphor (i) with a strontium-magnesium orthophosphate phosphor activated with tin at a suitable mixing ratio.

The characteristic feature of above-mentioned alkaline earth metal halophosphate phosphor activated with divalent europium to be employed for the fluorescent lamp of this invention is that there may be obtained diverse phosphors having the emission peak within the wavelength region of 480~500 nm by changing the mixing ratio of Ba, Ca and Mg of M in the formula $M_{5-x}X(PO_4)_3:Eu^{2+}{}_{(x)}$.

An advantage derived from the capability of shifting the emission peak is that a fluorescent lamp having superior characteristics within any range from a low color temperature (4000 K.) to a high color temperature (5600 K.) may be obtained by the sole combination of the alkaline earth metal halophosphate phosphor (phosphor (i)) with a phosphor having a peak wavelength of 620~640 nm and a half width of 120~960 nm, without any further phosphors. In addition, the phosphor (i)

herein disclosed is of quite a high efficiency and stability.

A EDL Type fluorescent lamp using only two kinds of phosphors has been proposed (Japanese Patent Publication No. 27554/1981). However, no fluorescent lamp of sufficient characteristics may be obtained with this combination of phosphors, because (Sr, Al)$_3$(PO$_4$)$_2$:Cu phosphor employed therein has rather poor efficiency and maintenance of luminous flux during operation.

The content (x) of europium in the above general formula is selected so as to satisfy inequality $0.01 < x \leq 0.2$.

When the subscript x is not more than 0.01, luminescent intensity of a produced phosphor will be severely decreased. When it is more than 0.2, luminescent intensity of a produced phosphor will not be remarkably improved any more. It is preferable that the inequality is determined to be $0.03 < x \leq 0.15$.

M, in turn, is determined to satisfy the relationship of Ba=3.0~4.5 gram-atom, Ca=0.5~2 gram-atom and Mg=0.01~1 gram-atom. A remarkable improvement in luminescent intensity may not be obtained if the magnesium content is below 0.1 or above 1, as compared to the case where only Ba and Ca are contained. A remarkable improvement in luminescent intensity may be observed by determining the Mg content at 0.1~0.5. The alkaline earth metal halophosphate phosphor activated with the divalent europium may readily be prepared by the following manner:

Predetermined amount of various compounds such as oxides, phosphates, carbonates or ammonium salts that may be sources of Ba, Ca, Mg, Zn, Cd, F, Cl, Br, P and Eu are weighed. The material mixture is thoroughly pulverized and mixed, for example, in a ball mill. The mixture is then placed in an alumina or quartz crucible and fired in air for 1~5 hours at 800°~1200° C. The fired product is allowed to cool, pulverized and sieved, then again fired at 800°~1200° C. in a slightly reducing atmosphere of, for example, a mixture of hydrogen and nitrogen. The again fired product is allowed to cool, pulverized, sieved, washed, filtered and again sieved to give the phosphor (i) to be employed in the invention.

Turning to the phosphor (ii) having the peak wavelength within the wavelength of 620~640 nm and having the half width of 120~160 nm to be employed with the phosphor (i), it turned out after extensive studies that the known strontium-magnesium orthophosphate phosphor activated with tin is preferred.

This invention will be described below in more detail by the following Examples, with reference to the accompanying drawings.

Figure 1:
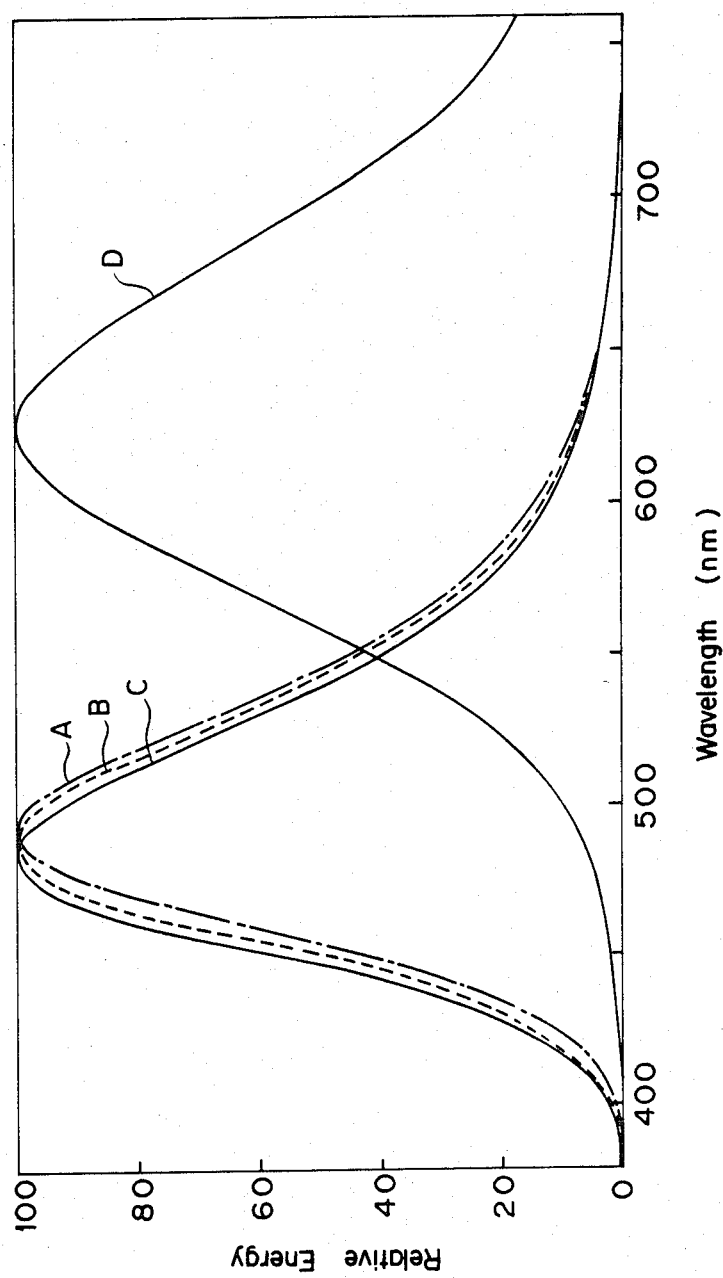
FIG. 1 shows spectral energy distributions of emission of each phosphor employed in the fluorescent lamp of the invention.

Composition, chromaticity, peak wavelength and half width of phosphors employed in the fluorescent lamp of the invention are shown in Table 1. Spectral energy distribution of the phosphors is shown in FIG. 1 (in which symbols correspond to those in Table 1).

EXAMPLE 1

Figure 4:
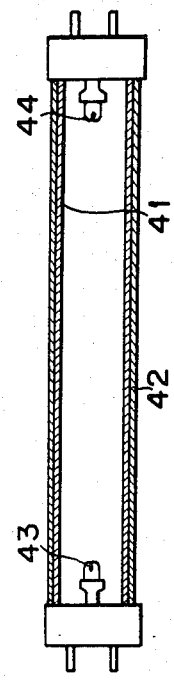
FIG. 4 shows the cross-sectional schematic view of the fluorescent lamp of the invention.

In the fluorescent lamp shown in FIG. 4, the phosphors of the symbols A and D in Table 1 infra were admixed in a proportion so that color temperature of 4200 K. with deviation ±0 uv was attained. The mixture 41 was coated inside of the glass tube 42 having the diameter of 32 mm as shown in FIG. 4. A 40 W fluorescent lamp having the discharge electrodes 43 and 44 was produced, of which the colorimetric and photometric measurements were performed. The results are summarized in Table 2.

The fluorescent lamp according to the invention showed the initial luminous flux of 2600~2850 lumen. It was confirmed that luminous flux decreased only very slightly during lamp operation.

TABLE 1

| Symbol | Phoshor | Chromaticity coordinate (FL 40S) x | y | Emission peak wavelength (nm) | Half width (nm) |
| --- | --- | --- | --- | --- | --- |
| A | Ba$_{3.6}$Ca$_{1.0}$Mg$_{0.3}$Cl(PO$_4$)$_3$:Eu(0.1) | 0.203 | 0.350 | 495 | 90 |
| B | Ba$_{3.9}$Ca$_{0.8}$Mg$_{0.3}$Cl(PO$_4$)$_3$:Eu(0.1) | 0.200 | 0.327 | 488 | 90 |
| C | Ba$_{4.2}$Ca$_{0.5}$Mg$_{0.3}$Cl(PO$_4$)$_3$:Eu(0.1) | 0.197 | 0.308 | 482 | 90 |
| D | (Sr, Mg)$_3$(PO$_4$)$_2$:Sn | 0.479 | 0.390 | 630 | 138 |

TABLE 2

| | Phosphor (Weight percent) | | Total luminous flux (100 hour value) (Lm) | Color temperature (K) | Deviation (uv) | Average color rendering index (Ra) | Special color rendering index | | | | | | |
| --- | --- | --- | --- | --- | --- | --- | --- | --- | --- | --- | --- | --- | --- |
| | (Ba,Ca,Mg)$_5$Cl(PO$_4$)$_3$:Eu | (Sr,Mg)$_3$(PO$_4$)$_2$:Sn | | | | | R$_9$ | R$_{10}$ | R$_{11}$ | R$_{12}$ | R$_{13}$ | R$_{14}$ | R$_{15}$ |
| Example 1 | 40 | 60 | 2450 | 4200 | 0 | 97 | 90 | 92 | 97 | 94 | 98 | 96 | 97 |
| 2 | 48 | 52 | 2400 | 5000 | 0 | 99 | 97 | 98 | 98 | 98 | 99 | 98 | 99 |
| 3 | 51 | 49 | 2420 | 5600 | 0 | 99 | 96 | 96 | 99 | 92 | 98 | 98 | 98 |
| Prior art | Mixture of (1) MgWO$_4$, (2) (Sr,Mg)$_3$(PO$_4$)$_2$:Sn, and (3) 3.5MgO.0.5MgF$_2$.GeO$_2$:Mn | | 2000 | 5000 | 0 | 98 | 90 | 95 | 98 | 95 | 98 | 98 | 97 |

EXAMPLE 2

The phosphors of the symbols B and D shown in Table 1 above were admixed in a ratio so that color temperature of 5000 K. with deviation ±0 uv was obtained. A fluorescent lamp was produced with the mixture following the same procedures as in Example 1, of which the colorimetric and photometric measurements were performed. The results are summarized also in Table 2.

EXAMPLE 3

The phosphors of the symbols C and D shown in Table 1 were admixed in a proportion so that color temperature of 5600 K. with deviation ±0 uv was obtained. A fluorescent lamp was produced with the mixture following the same procedures as in Example 1, of which the colorimetric and photometric measurements were performed. The results are also summarized in Table 2.

Figure 2:
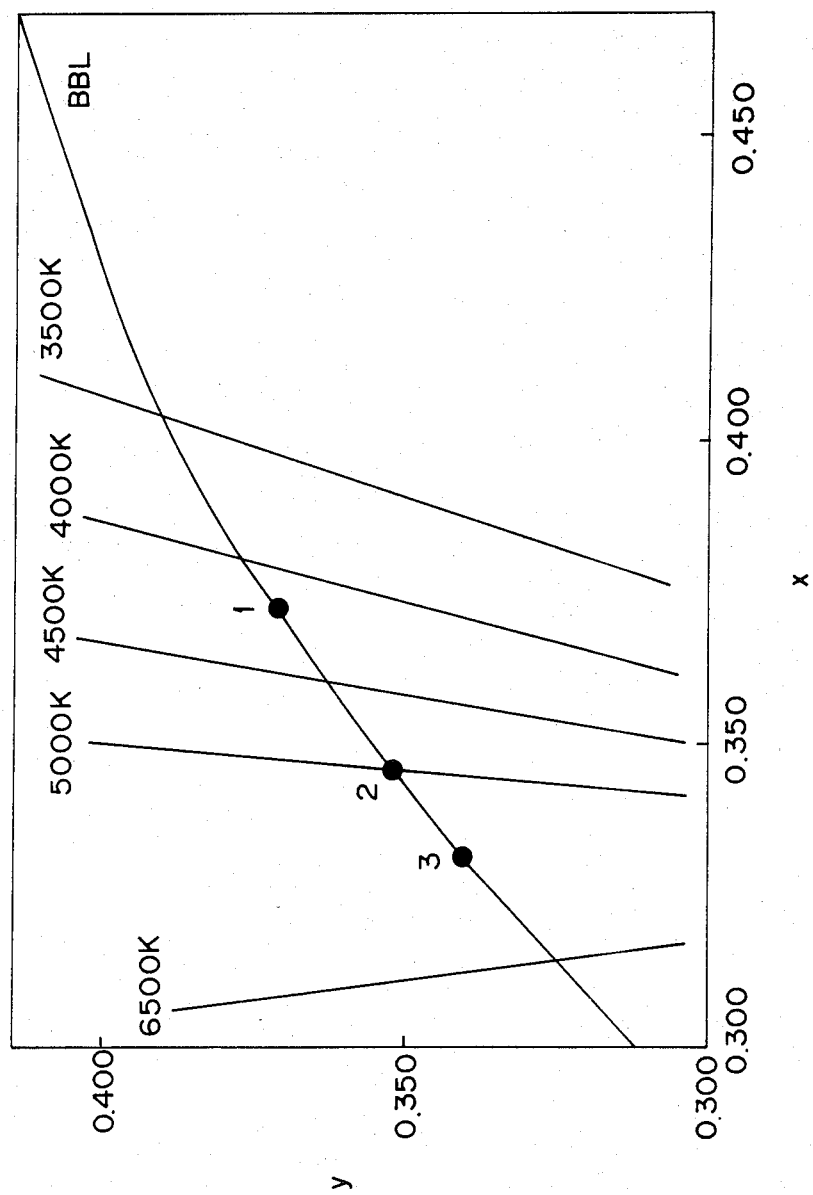
FIG. 2 shows chromaticity of emission color of the fluorescent lamp.
Figure 3:
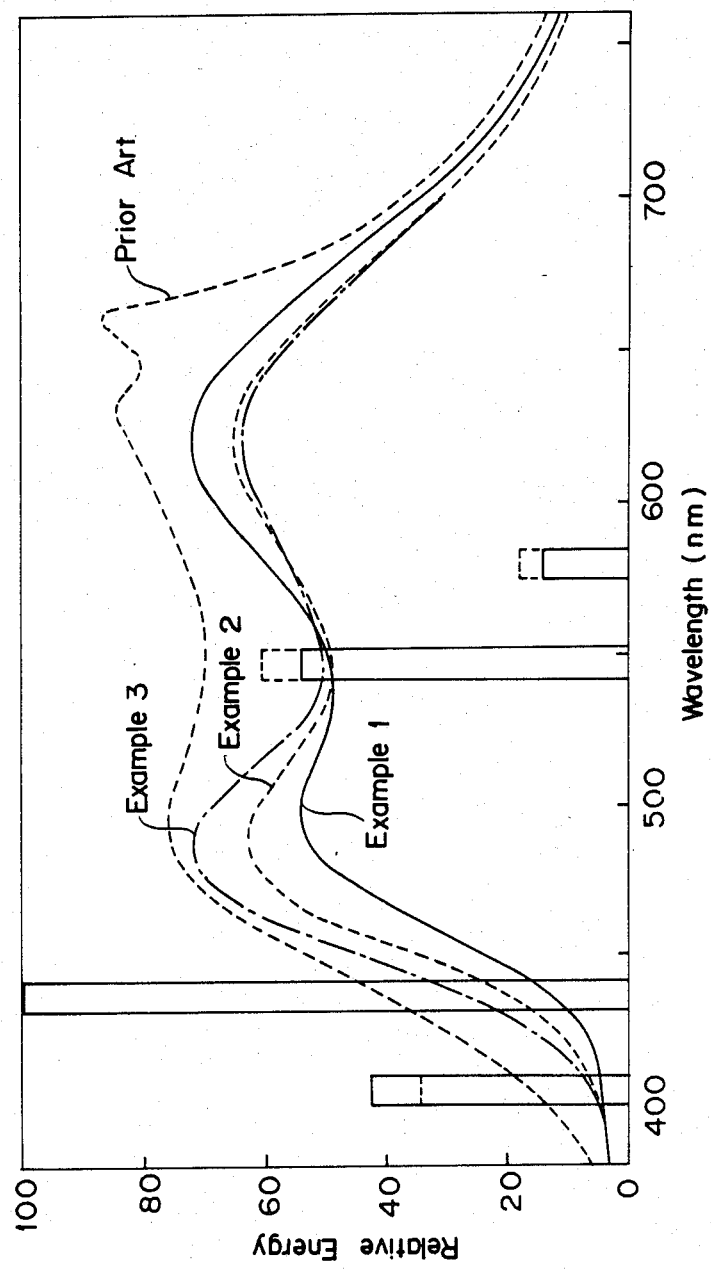
FIG. 3 shows spectral energy distributions of emission of the fluorescent lamps indicated in Examples 1 to 3, in comparison with prior art having the double layer coating.

Chromaticity coordinates and spectral energy distributions of the lamps obtained in Examples 1–3 are indicated in FIGS. 2 and 3, respectively (The numbers in the Figures correspond to those of Examples, respectively).

It is evident from the foregoing Examples that, in the fluorescent lamp according to the invention, the average color rendering index (Ra) can be made more than 95 and that the total luminous flux (lm) is improved by about 20%, within color temperature range of 4000~5000 K., without any double layer coating or pigment layer used in prior art fluorescent lamps, by employing as a blue-green phosphor an alkaline earth metal halophosphate phosphor activated with divalent europium, and a strontium-magnesium orthophosphate phosphor activated with tin, and by selecting the peak wavelength of the former phosphor and also by changing the mixing proportion of the former and the latter phosphors properly.

According to the invention, production efficiency of fluorescent lamps is remarkably improved and variations of emitted color and of color rendering index are decreased to enable an easy quality control, by virtue of there being no requirement for double layer coating or pigment layer coating process.

We claim:

1. A fluorescent lamp which comprises a glass tube and a mixture of a phosphor (i) comprising an alkaline earth metal halophosphate phosphor activated with divalent europium, represented by the formula:

$$M_{5-x}X(PO_4)_3:Eu^{2+}{}_{(x)}$$

wherein M consists of 3 to 4.5 gram-atom of barium, 0.5 to 2 gram-atom of calcium and 0.01 to 1 gram-atom of magnesium; X is one or more of fluorine, chlorine or bromine; and x is a positive value of more than 0.01 and not more than 0.2,
said phosphor (i) having an emission peak in the wavelength region of 480 to 500 nm and exhibiting a higher luminsecent intensity than said phosphor (i) absent magnesium; and a phosphor (ii) having an emission peak in the wavelength region of 620 to 640 nm and a half width of 120 to 160 nm, said mixture being coated inside of said glass tube.

2. The fluorescent lamp according to claim 1, wherein said phosphor (ii) is strontium-magnesium orthophosphate phosphor activated with tin.

3. The fluorescent lamp according to claim 1, wherein said X is chlorine (Cl).

* * * * *